(12) United States Patent
Norris et al.

(10) Patent No.: US 8,127,547 B2
(45) Date of Patent: Mar. 6, 2012

(54) GAS TURBINE ENGINE WITH AIR AND FUEL COOLING SYSTEM

(75) Inventors: James W. Norris, Lebanon, CT (US); Andrew P. Berryann, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1543 days.

(21) Appl. No.: 11/759,315

(22) Filed: Jun. 7, 2007

(65) Prior Publication Data

US 2008/0304958 A1    Dec. 11, 2008

(51) Int. Cl.
*F02C 1/00* (2006.01)
(52) U.S. Cl. .............................. 60/730; 60/736; 60/806
(58) Field of Classification Search ................ 60/730, 60/736, 39.511, 806, 740, 742; 415/179; 165/43
See application file for complete search history.

(56) References Cited

U.S. PATENT DOCUMENTS

| | | | | |
|---|---|---|---|---|
| 3,038,308 | A * | 6/1962 | Fuller et al. ................ | 60/39.55 |
| 3,287,906 | A * | 11/1966 | McCormick ............... | 60/39.511 |
| 3,429,122 | A | 2/1969 | Pravada et al. | |
| 3,730,644 | A * | 5/1973 | Jubb .............................. | 416/95 |
| 3,935,849 | A | 2/1976 | Mills | |
| 3,969,892 | A * | 7/1976 | Stettler et al. ............. | 60/39.511 |
| 4,258,780 | A | 3/1981 | Suo | |
| 4,478,814 | A | 10/1984 | Kesten | |
| 4,712,610 | A | 12/1987 | Kesten | |
| 4,966,229 | A | 10/1990 | Senterfitt | |
| 5,142,859 | A * | 9/1992 | Glezer et al. .................. | 60/806 |
| 5,192,186 | A | 3/1993 | Sadler | |
| 5,255,505 | A * | 10/1993 | Cloyd et al. .................. | 60/806 |
| 5,267,608 | A | 12/1993 | Coffinberry | |
| 5,439,351 | A | 8/1995 | Artt | |
| 5,794,448 | A * | 8/1998 | Fujioka et al. ................ | 60/736 |
| 5,865,030 | A * | 2/1999 | Matsuhama ................... | 60/736 |
| 5,975,841 | A | 11/1999 | Lindemuth | |
| 6,295,803 | B1 * | 10/2001 | Bancalari ................... | 60/39.511 |
| 6,578,362 | B1 | 6/2003 | Coffinberry | |
| 6,931,834 | B2 | 8/2005 | Jones | |
| 6,990,797 | B2 | 1/2006 | Venkataramani | |
| 2005/0241320 | A1 * | 11/2005 | Blonn et al. ................... | 60/782 |
| 2006/0225425 | A1 | 10/2006 | Kobayashi et al. | |

FOREIGN PATENT DOCUMENTS

| | | |
|---|---|---|
| EP | 1154135 | 11/2001 |
| GB | 2264539 | 9/1993 |
| WO | 9744575 | 11/1997 |
| WO | 20040016921 | 11/2004 |

OTHER PUBLICATIONS

European Search Report Dated Oct. 28, 2010.

* cited by examiner

*Primary Examiner* — Louis Casaregola
*Assistant Examiner* — Phutthiwat Wongwian
(74) *Attorney, Agent, or Firm* — Carlson, Gaskey & Olds, PC

(57) ABSTRACT

A gas turbine engine is provided with a first heat exchanger associated with a cooling air flow to deliver cooling air to a turbine section. A second heat exchanger is associated with a fuel supply line for delivering fuel into a combustion section. An intermediate fluid cools air at the first heat exchanger and heats fuel at the second heat exchanger.

11 Claims, 2 Drawing Sheets

GAS TURBINE ENGINE WITH AIR AND FUEL COOLING SYSTEM

BACKGROUND OF THE INVENTION

This application relates to a cooling system for cooling air in a gas turbine engine by heating fuel, and wherein an intermediate fluid is utilized to perform the heat exchange.

Gas turbine engines are known, and typically include a compressor for compressing air and delivering it downstream into a combustion section. The compressed air is mixed with fuel and combusted in the combustion section. The products of this combustion are then delivered downstream over turbine rotors which are driven to rotate, to provide power to the engine.

The turbine rotors are subjected to very high temperatures by the products of combustion. Thus, it is known to tap cooling air and deliver that cooling air to components of the turbine section to cool those components.

However, competing with this use of air is the goal to provide higher pressure ratios at the compressor for improved combustion. As the pressure ratios increase, so does the air temperature. Thus, the air downstream of the compressor is less useful as cooling air since it becomes hotter to provide the higher pressure ratios.

It has been proposed to cool the air downstream of the compressor by exchanging heat in the air to fuel being delivered into the combustion section. Generally, this has been performed by placing the air and fuel in close heat exchange relationship.

This is somewhat undesirable, in that having quantities of cooling air in the vicinity of the fuel makes any air or fuel leakage more risky.

SUMMARY OF THE INVENTION

In the disclosed embodiment of this invention, an intermediate fluid cools air which is to be utilized as cooling air and transfers heat to the fuel at a location adjacent to the combustion section. In disclosed embodiments, the exchanger for cooling the air may be in a plenum for delivering the cooling air to turbine sections. In one embodiment, the intermediate fluid is provided by a heat pipe.

These and other features of the present invention can be best understood from the following specification and drawings, the following of which is a brief description.

DETAILED DESCRIPTION OF THE PREFERRED EMBODIMENT

Figure 1:
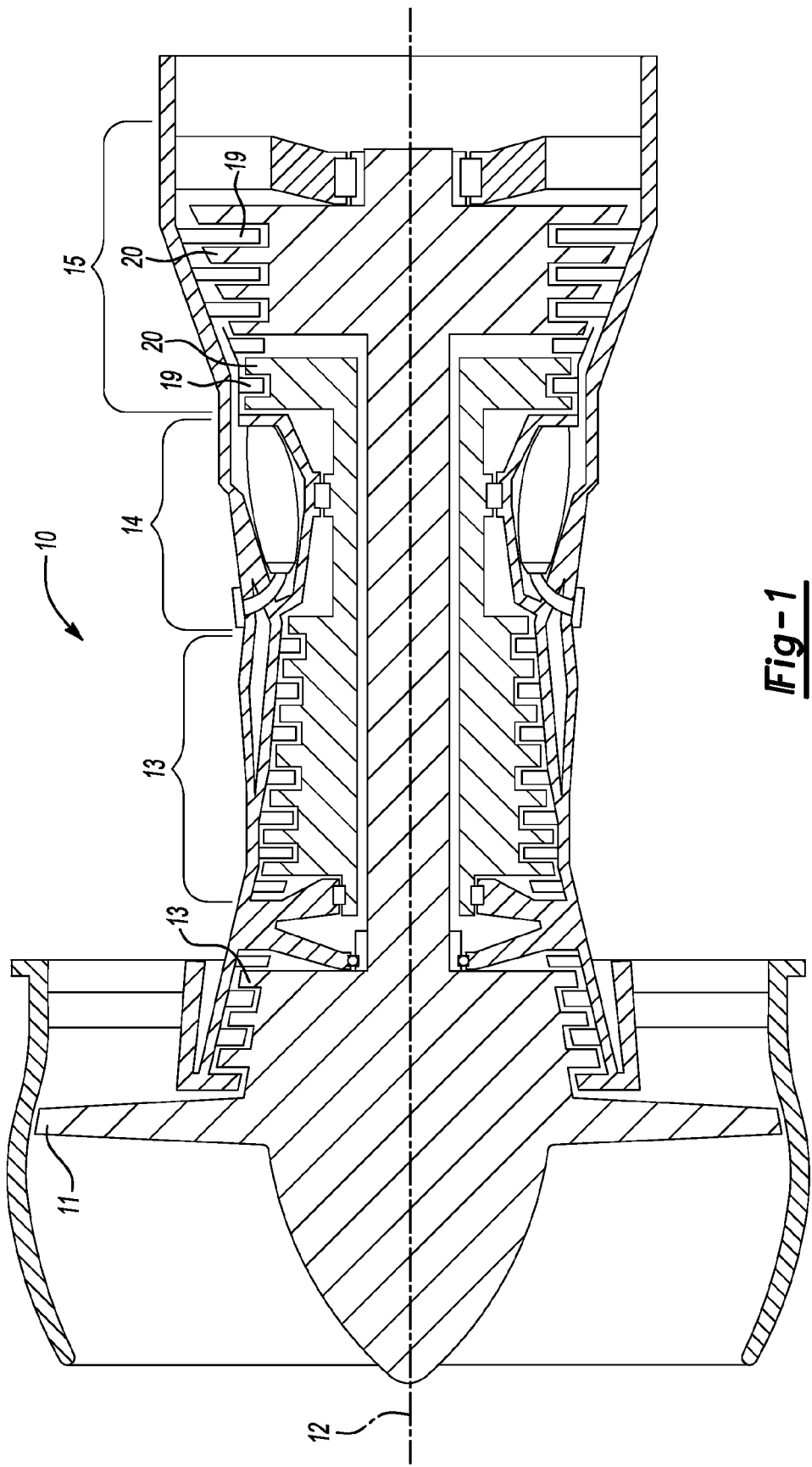
FIG. 1 is a schematic view of the gas turbine engine.

A gas turbine engine 10, such as a turbofan gas turbine engine, circumferentially disposed about an engine centerline, or axial centerline axis 12 is shown in FIG. 1. The engine 10 includes a fan 11, compressors 13, a combustion section 14, and a turbine section 15. As is well known in the art, air compressed in the compressors 13 is mixed with fuel and burned in the combustion section 14, and expanded across turbine rotors. The turbine rotors include blades 20 and static airfoils or vanes 19. This structure is shown somewhat schematically in FIG. 1. It should be understood that this application extends to other types of gas turbine engines for any application.

Figure 2:
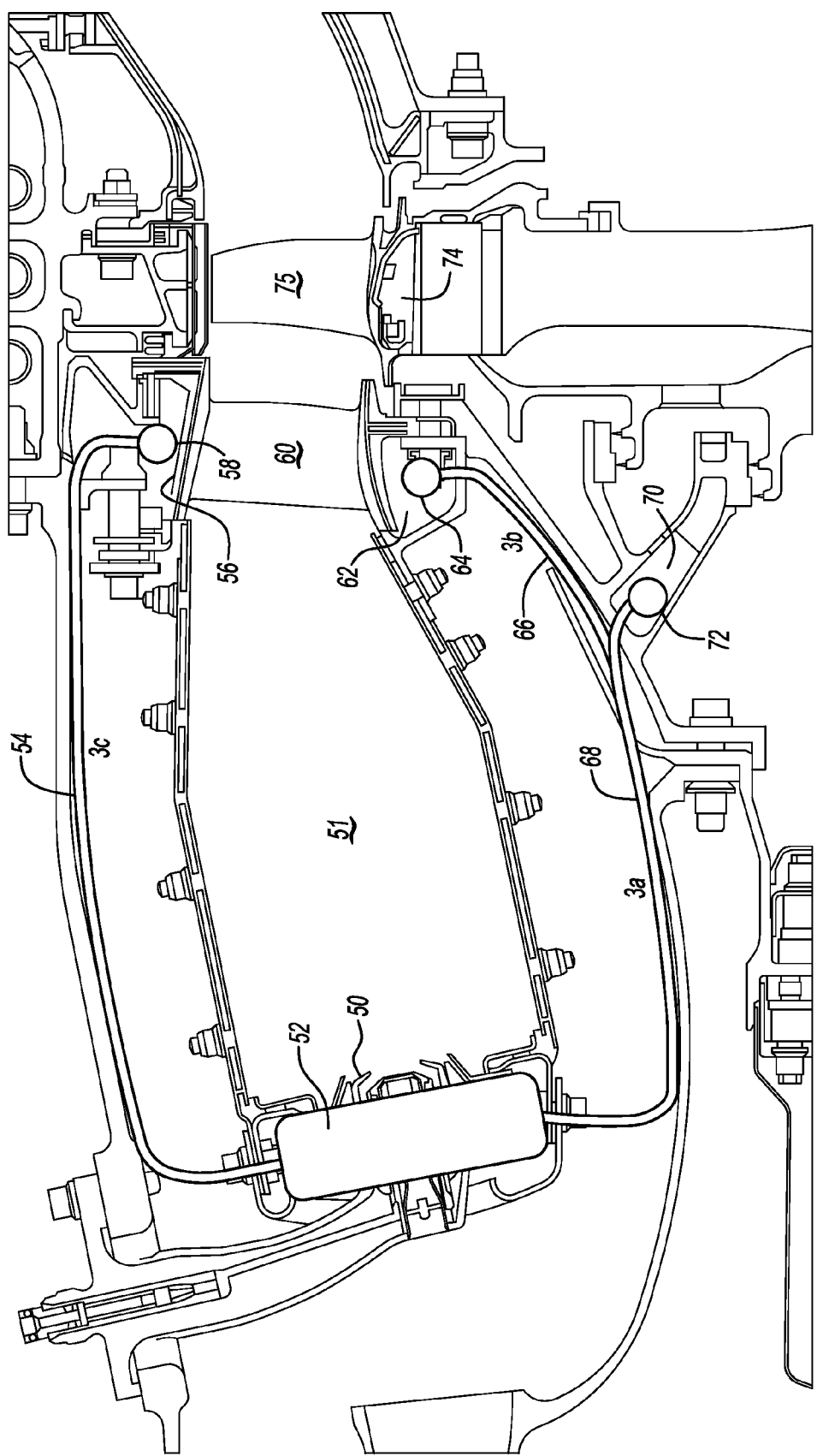
FIG. 2 shows a view of an air cooling system according to this application.

As shown in FIG. 2, a system for heating fuel being delivered through fuel nozzle/spray bars 50 into a combustion chamber 51 is provided by a heat exchanger 52 associated with the fuel nozzle/spray bar 50. The heat exchanger 52 communicates through a heat pipe 54 with the interior of a cooling air plenum 56. A heat exchanger 58 is positioned within the plenum 56, and will cool air being delivered to cool a static vane 60. A similar plenum 62 is provided with heat exchanger 64 and a heat pipe 66. Yet another heat pipe 68 communicates into a plenum 70 and to a heat exchanger 72. Plenum 70 may be for delivering cooling air to an inner peripheral chamber 74 to cool a turbine blade 75. An intermediate fluid flowing through the heat pipes cools the air across the heat exchangers 58, 64 and 72 at a location adjacent the use of this cooling air. There is now less chance for this cooling air to mix with fuel at the combustion section. Moreover, the fuel is heated in the heat exchanger 52, at the combustion section, and there is little chance for fuel leakage causing any concerns.

As known, a heat pipe generally includes a porous medium which wicks a liquid by capillary action from a cool source, here the interior of heat exchanger 52, toward a hot source, here the interior of air heat exchangers 58, 64 and 72. As the liquid reaches the heat exchanger 58, 64 and 72, it is vaporized by hot air flowing across the heat exchangers, absorbing the heat. This cools the air. This vaporized fluid then expands back through channels in the porous medium of the heat pipes toward the cool source, or heat exchanger 52 where it is again condensed by cool fuel flowing across heat exchanger 52. This is a continuous action driven by the difference in temperature. Heat pipes are well known technology, however, they have not been utilized in this particular application. The use of intermediate fluid, and in the disclosed embodiment heat pipes, allows the air to be cooled where it is to be utilized while heating the fuel adjacent to where it will be burned.

It should be understood that several sets of the heat exchangers and heat pipes may be positioned circumferentially spaced about axis 12.

While an embodiment of this invention has been disclosed, a worker of ordinary skill in this art would recognize that certain modifications would come within the scope of this invention. As an example, intermediate fluids other than in a heat pipe may be used. For that reason, the following claims should be studied to determine the true scope and content of this invention.

What is claimed is:

1. A system for cooling air in a gas turbine engine comprising:
    a first heat exchanger in contact with cooling air delivered to a turbine section in a gas turbine engine;
    a second heat exchanger positioned around a fuel nozzle adjacent to a combustion section in the gas turbine engine, and the second heat exchanger positioned in contact with fuel being delivered into the combustion section by the fuel nozzle; and
    an intermediate fluid for transferring heat from the first heat exchanger to the second heat exchanger, said intermediate fluid being provided by a heat pipe.

2. The cooling system as set forth in claim 1, wherein there are a plurality of heat exchangers associated with locations for cooling air communicating with one heat exchanger for heating the fuel.

3. The cooling system as set forth in claim 1, wherein there are a plurality of circumferentially spaced first and second heat exchangers and intermediate fluids.

4. The cooling system as set forth in claim 1, wherein said heat pipe includes a porous medium which wicks a liquid by capillary action from said second heat exchanger to said first heat exchanger.

5. A gas turbine engine comprising:
- a compression section;
- a combustion section;
- a turbine section; and said combustion section including a fuel supply for delivering fuel into the combustion section;
- a first heat exchanger in contact with cooling air to be delivered to the turbine section in a gas turbine engine;
- a second heat exchanger positioned around a fuel nozzle adjacent the fuel supply system, and the second heat exchanger positioned in contact with fuel being delivered into the combustion section by the fuel nozzle; and
- an intermediate fluid for transferring heat from the first heat exchanger to the second heat exchanger.

6. The engine as set forth in claim 5, wherein there are a plurality of heat exchangers associated with locations for cooling air communicating with one heat exchanger for heating the fuel.

7. The engine as set forth in claim 5, wherein the intermediate fluid is provided by a heat pipe.

8. The engine as set forth in claim 7, wherein said heat pipe includes a porous medium which wicks a liquid by capillary action from said second heat exchanger to said first heat exchanger.

9. The engine as set forth in claim 5, wherein there are a plurality of circumferentially spaced first and second heat exchangers and intermediate fluids.

10. The engine as set forth in claim 5, wherein said second heat exchanger is associated with a fuel nozzle and spray bar arrangement for delivering the fuel into the combustion section.

11. The engine as set forth in claim 5, wherein there is a cooling air plenum providing cooling air to at least one of a static vane and a rotating blade in the turbine section, and said first heat exchanger being positioned within said cooling air plenum.

* * * * *